(12) United States Patent
Billington et al.

(10) Patent No.: US 7,831,406 B2
(45) Date of Patent: Nov. 9, 2010

(54) METHOD OF SENSOR MULTIPLEXING FOR ROTATING MACHINERY

(75) Inventors: Scott Billington, Matran (CH); Jonathan Geisheimer, Neyruz (CH); Phillip Moore, Snellville, GA (US)

(73) Assignee: Radatec, Inc., Fribourg (CH)

( * ) Notice: Subject to any disclaimer, the term of this patent is extended or adjusted under 35 U.S.C. 154(b) by 879 days.

(21) Appl. No.: 11/787,189

(22) Filed: Apr. 13, 2007

(65) Prior Publication Data

US 2007/0253461 A1    Nov. 1, 2007

Related U.S. Application Data

(60) Provisional application No. 60/792,104, filed on Apr. 13, 2006.

(51) Int. Cl.
*G06F 19/00* (2006.01)
(52) U.S. Cl. .................................................. 702/121

(58) Field of Classification Search ................. 702/121, 702/76, 77, 182–185
See application file for complete search history.

(56) References Cited

U.S. PATENT DOCUMENTS 6,489,917 B2    12/2002    Geisheimer et al.
7,084,369 B2 *   8/2006    Sosnowski ............. 219/121.43

* cited by examiner

*Primary Examiner*—Edward Raymond
(74) *Attorney, Agent, or Firm*—King & Spalding LLP

(57) ABSTRACT

Controlling a multiplexer for switching between probes of a microwave sensor. The multiplexer is used to select one of the probes at any one time of operation of the sensor. Signal processing constants are updated for the selected probe. One or more signal conditioning devices are adjusted to optimize signal noise levels and dynamic range for the probe. The transmit frequency is set for the probe. Upon expiration of a transition period, a data acquisition operation or measurement operation is conducted with the probe. In turn, a time for switching to the next probe is calculated and applied prior to enabling the multiplexer to switch to another probe. These tasks are completed steps for each of the remaining probes of the microwave sensor and then repeated again for continuing operation of the sensor.

2 Claims, 4 Drawing Sheets

METHOD OF SENSOR MULTIPLEXING FOR ROTATING MACHINERY

RELATED APPLICATION

Applicants claim priority under 35 U.S.C. 119 to an earlier-filed provisional patent application, U.S. Provisional Patent Application Ser. No. 60/792,104, filed on Apr. 13, 2006, entitled "Blade Tip Clearance Multiplexing". The subject matter disclosed by this provisional patent application is fully incorporated within the present application by reference herein.

TECHNICAL FIELD

The present invention relates to rotating machinery measurement and more particularly to the design and use of a multiplexing device to reduce the number of electronics cards needed within typical measurement applications.

BACKGROUND OF INVENTION

Past inventions have described a new class of sensor for non-contact measurement of distance (U.S. Pat. No. 6,489,917 to Geisheimer et al.). These sensors typically comprise microwave and signal processing electronics connected to a probe via a cable. The probe contains an antenna for radiating a microwave signal to an object being measured. Since there are no electronics or active elements or coils in the probe, the systems can use high temperature construction and are well suited for monitoring in high temperature environments. Gas turbine engines provide some of the hottest environments for temperature measurement. This class of sensors is also well suited for applications with high electromagnetic fields, such as large generators on gas turbines or hydroelectric dams.

In rotating machinery, the microwave sensors would normally measure the distance between the case and the rotor, or in a bladed rotor case the individual blades. The rotor orbit is often not circular and contains some amount of rotordynamics that cause the rotors to move eccentrically. To accurately characterize the motion, at least two probes are positioned 90 degrees apart from one another to measure the two-dimensional motion. In more complex situations, the case into which the sensor is mounted may deform into an oval or tri-lobe shape that can affect the distances between the rotor and the case. To accurately characterize these conditions, additional sensors may be needed, up to eight or more per stage to be monitored. If multiple stages are to be measured the number of probes can exceed 64 or more.

In many situations, it is not necessary to continuously record data from all of the probes at the same time. Also, current embodiments of sensor systems need one electronics card for every probe to be measured. The large number of cards can take up a large amount of space and power. Therefore, it is desirable to have a technique that could reduce the number of electronics cards in the system while still being able to collect the necessary data to accurately characterize the rotating machinery. Also, in applications such as monitoring aircraft engines, weight is a significant concern. Therefore, any method that decreases the weight of the overall system while providing the same monitoring benefits is advantageous to the user.

In view of the foregoing, it will be appreciated that the application of multiple sensors for measuring rotating machinery requires a different approach than that found in the prior art. Thus, a heretofore unaddressed need exists in the industry to address the aforementioned deficiencies and inadequacies.

SUMMARY OF INVENTION

The present invention implements a method to multiplex multiple sensors for monitoring rotating equipment. The multiplexed sensor concept can be achieved by at least one electronics card, a multiplexer device, multiple probes, along with the necessary software and logic to control the multiplexer and update signal conditioning and other sensor control parameters.

The present invention is directed to controlling a multiplexer for switching between probes of a microwave sensor. The multiplexer is used to select one of the probes at any one time of operation of the sensor. Signal processing constants are updated for the selected probe. One or more signal conditioning devices are adjusted to optimize signal noise levels and dynamic range for the probe. The transmit frequency is set for the probe. Upon expiration of a transition period, a data acquisition operation or measurement operation is conducted with the probe. In turn, a time for switching to the next probe is calculated and applied prior to enabling the multiplexer to switch to another probe. These tasks are completed steps for each of the remaining probes of the microwave sensor and then repeated again for continuing operation of the sensor.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of exemplary embodiments of the present invention. Moreover, in the drawings, reference numerals designate corresponding parts throughout the several views.

DETAILED DESCRIPTION OF THE EXEMPLARY EMBODIMENTS

Exemplary embodiments of the present invention support a methodology for multiplexing multiple sensors with a single electronics card.

Figure 1:
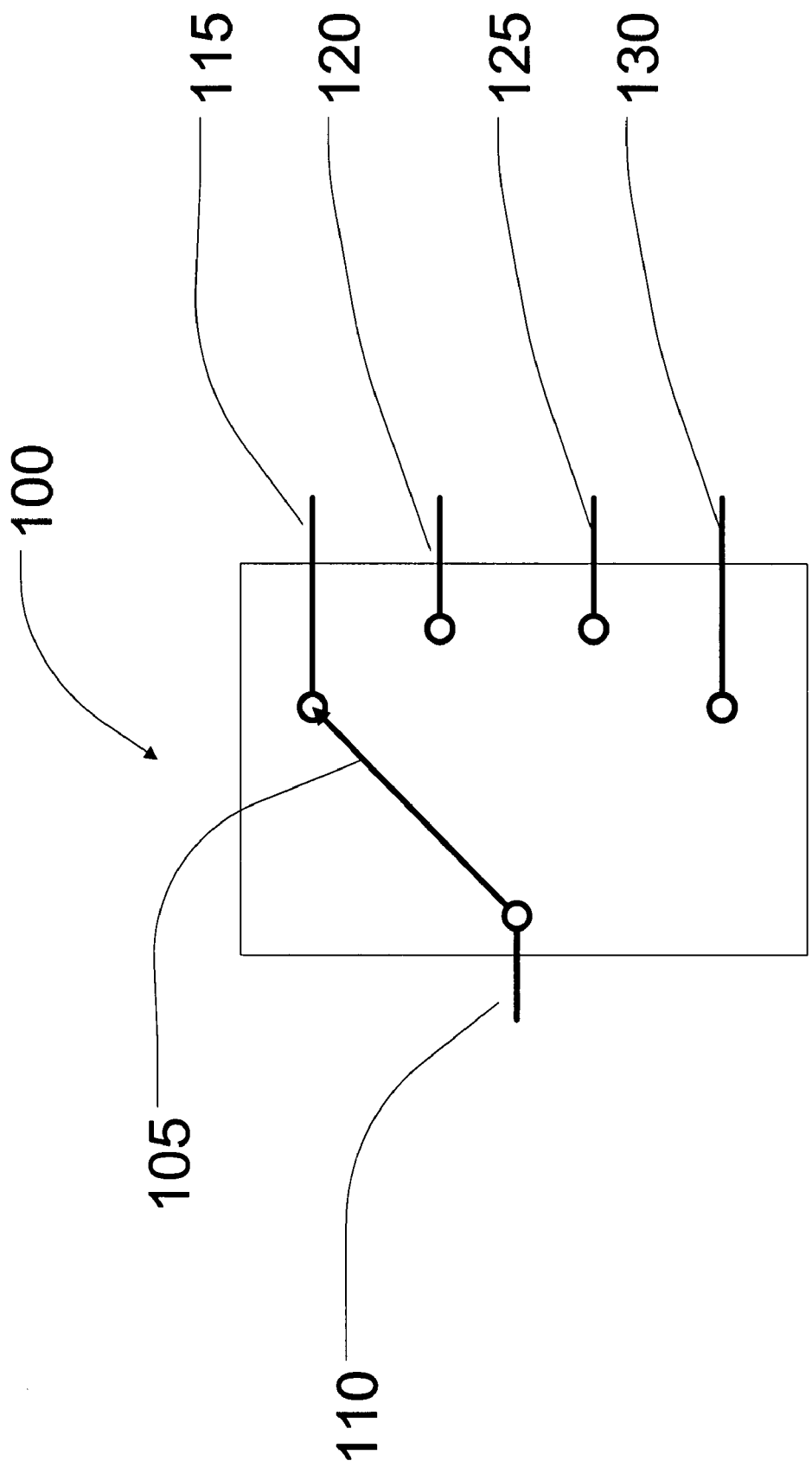
FIG. 1 is a diagram of a multiplexer that can be used to switch a single electronics card to multiple probes in accordance with an exemplary embodiment of the present invention.
Figure 2:
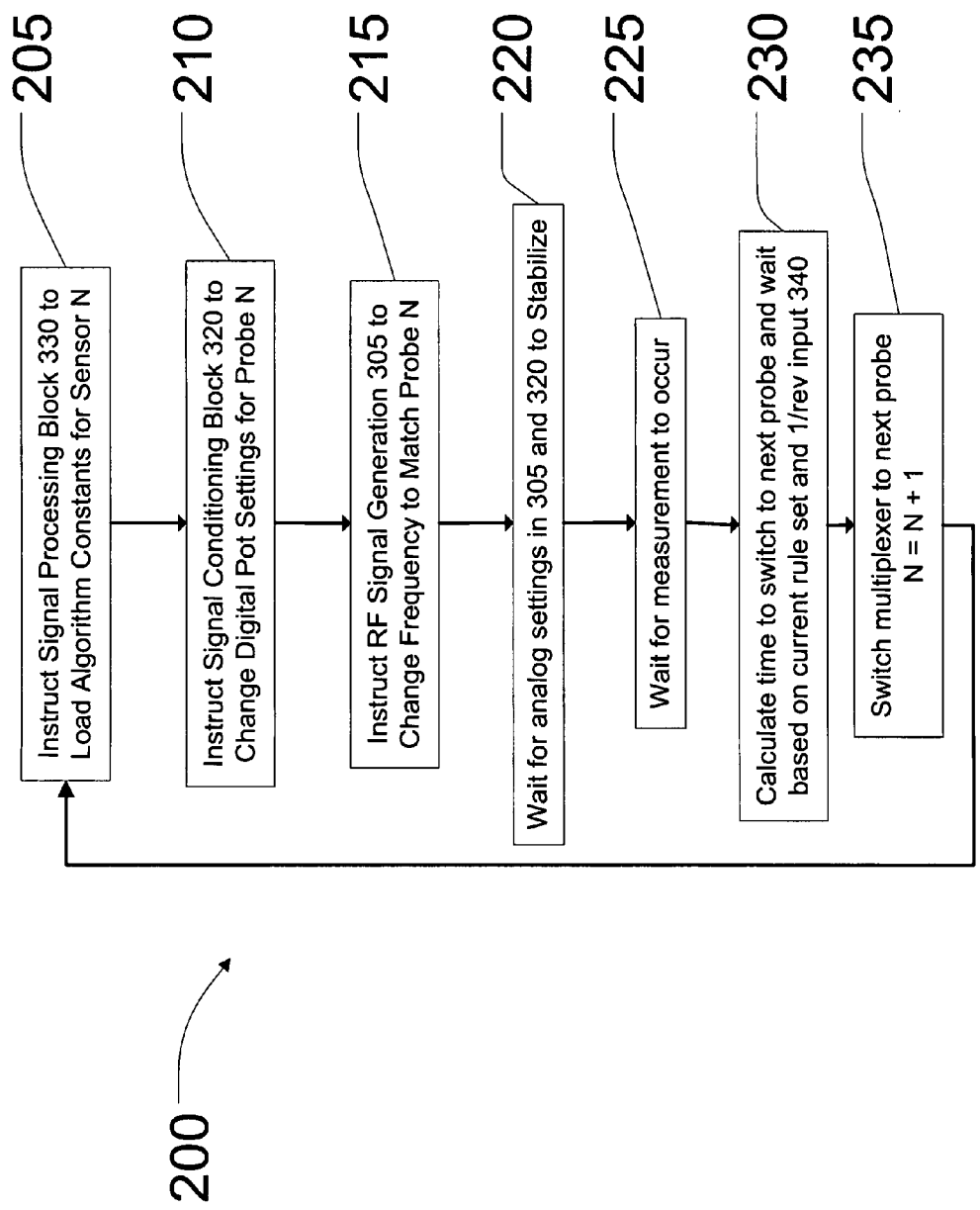
FIG. 2 is a flow chart disclosing a process for controlling the multiplexer illustrated in FIG. 1 and updating signal conditioning and other electronics constants in accordance with an exemplary embodiment of the present invention.
Figure 3:
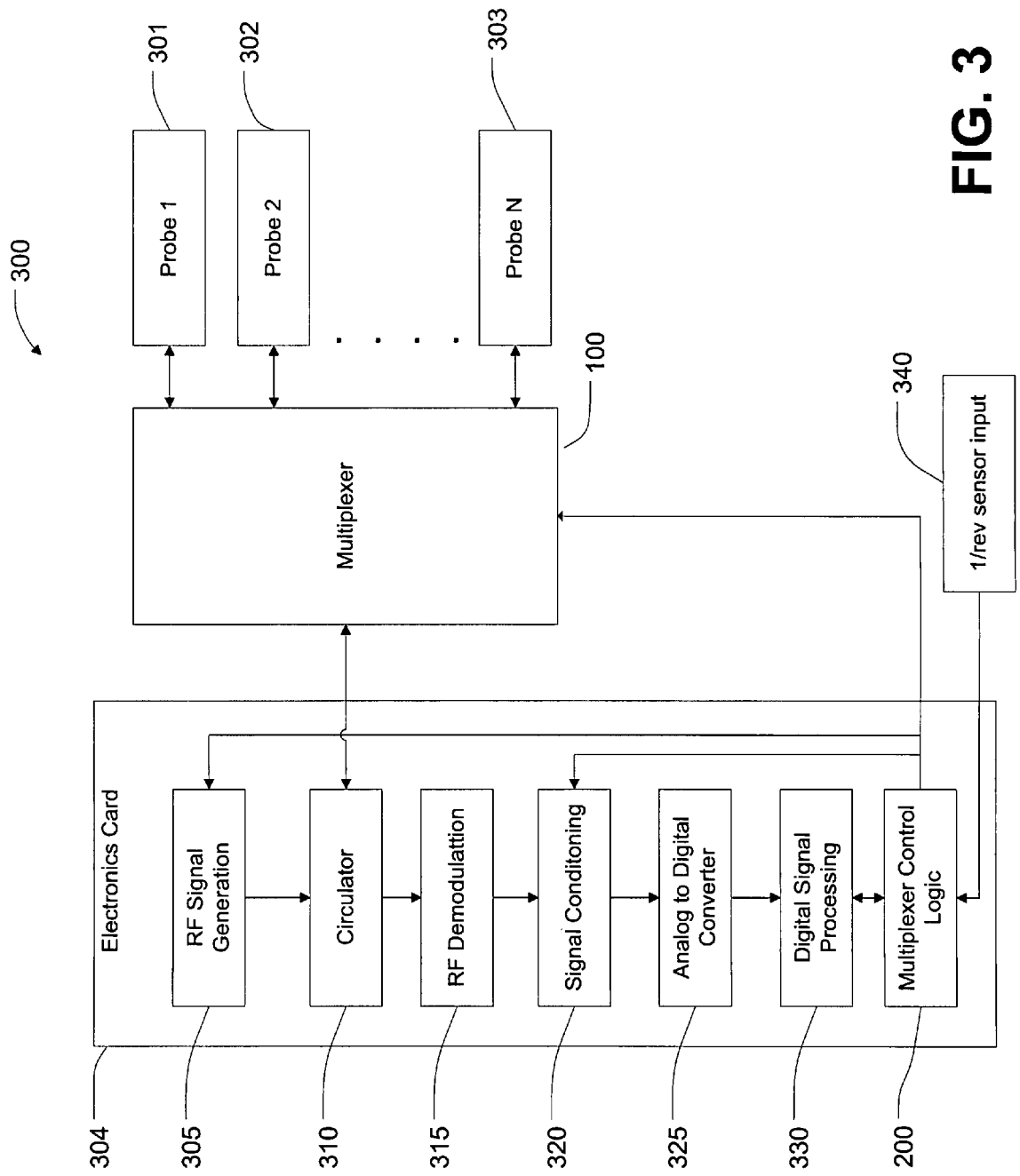
FIG. 3 is a block diagram illustrating the application of a multiplexer technique to a microwave distance measurement sensor in accordance with an exemplary embodiment of the present invention.
Figure 4:
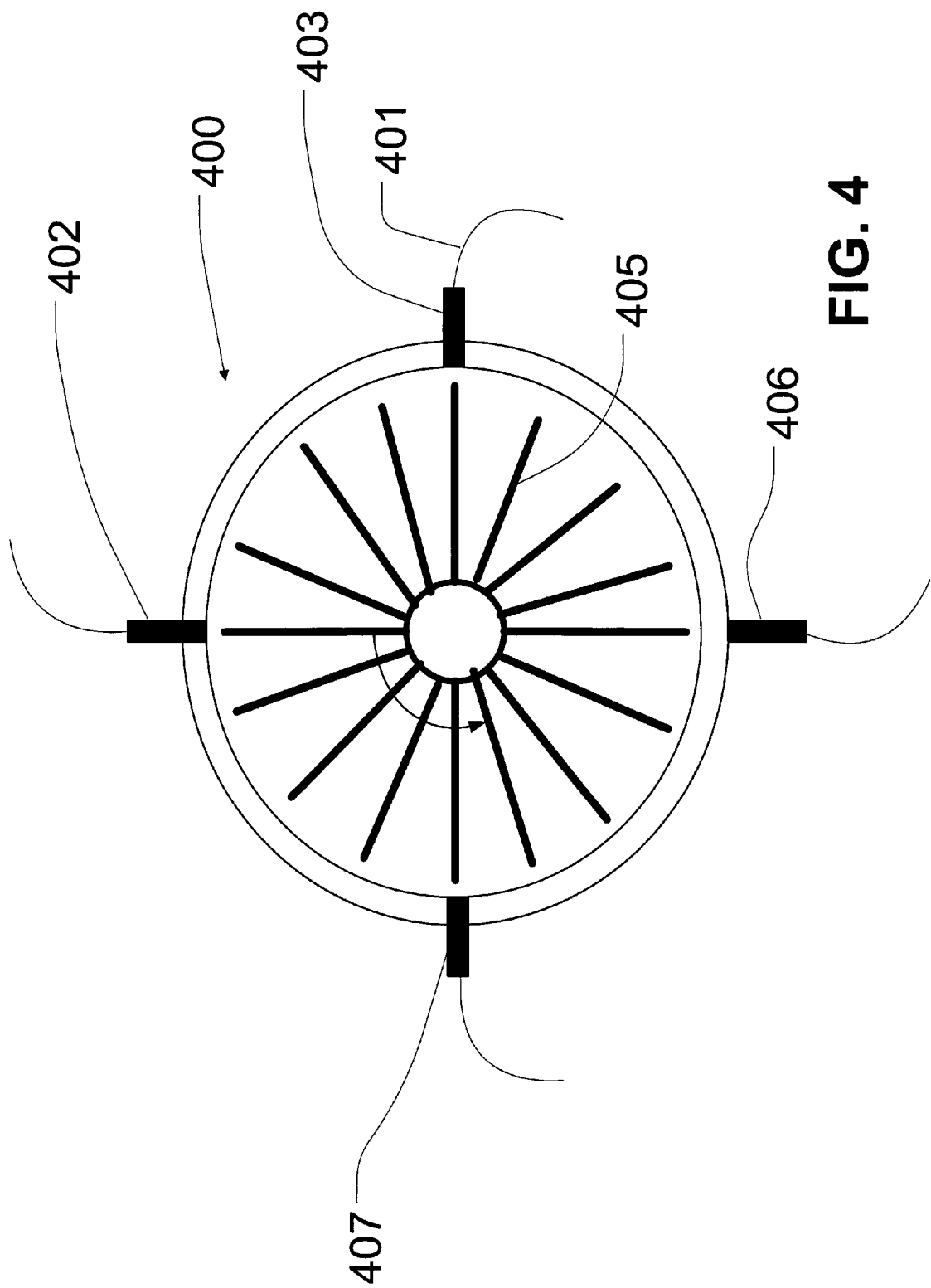
FIG. 4 is a diagram of a multiplexer device applied to a turbine engine in accordance with an exemplary embodiment of the present invention.

Exemplary embodiments of the present invention will now be described more fully hereinafter with reference to FIGS. 1-4, in which embodiments of the invention are shown. FIG. 1 is a diagram of a multiplexer that can be used to switch a single electronics card to multiple probes in accordance with an exemplary embodiment of the present invention. FIG. 2 is a flow chart disclosing a process for controlling the multiplexer illustrated in FIG. 1 and updating signal conditioning and other electronics constants in accordance with an exemplary embodiment of the present invention. FIG. 3 is a block diagram illustrating the application of a multiplexer technique to a microwave distance measurement sensor in accordance with an exemplary embodiment of the present invention. FIG. 4 is a diagram of a multiplexer device applied to a turbine engine in accordance with an exemplary embodiment of the present invention.

This invention can be embodied in many different forms and should not be construed as limited to the embodiments set forth herein; rather, these embodiments are provided so that this disclosure will be thorough and complete, and will fully convey the scope of the invention to those having ordinary sill in the art. Furthermore, all representative "examples" given herein are intended to be non-limiting, and among others supported by exemplary embodiments of the present invention.

FIG. 1 shows an exemplary multiplexer 100 that can be used to switch a single signal amongst multiple probes. In this example, the electronics card output is connected to port 110 and the switch 105 is used to multiplex a single electronics card to four different sensors, connected to 115, 120, 125, and 130. In an exemplary embodiment, the multiplexer can be connected to microwave displacement sensors and would use a multiplexer device capable of carrying microwave frequencies. An representative multiplexer device is model HMC322LP4 manufactured by Hittite Corporation of Chelmsford, Mass. This multiplexer device is useful for switching a single electronics card to four probes. Other multiplexer devices are available for switching up to eight or more probes.

FIG. 2 shows a flow chart 200 illustrating an exemplary process for switching a multiplexer for a microwave sensor. The first step 205 is to update algorithm constants 205 used by the signal processing module 330 for the particular probe being used for the microwave sensor. All of the constants for each of the probes can be stored in a memory table or other storage device and recalled when the particular probe is selected by the multiplexer for operation. For a microwave displacement sensor, the probe calibration and other algorithm constants are loaded in a storage device or memory table.

In step 210, the signal conditioning chain 320 is updated. Nearly all sensors use analog signal conditioning to optimize the signal noise levels and dynamic range before the analog to digital conversion or analog output of the measurement value takes place. Normally, the signal conditioning consists of amplification, DC offset adjustment, and low pass filtering, as known by one versed in the art. Most new sensors use digital potentiometers that can be updated via a microprocessor or microcontroller. In an exemplary embodiment, digital potentiometers are used to control all aspects of the signal conditioning and are updated automatically by the system.

In a microwave distance measuring system, each of the probes contains an antenna that will have a frequency where it radiates most efficiently, also referred to as the center frequency of the antenna. Due to tolerances, manufacturing processes, and possibly different temperatures of the probes, the center frequency of the various antennas may differ. Therefore, in step 215, a task is completed to update the transmit frequency of the RF generation section of the electronics card 305 to tune the frequency to the particular probe being used. Other types of sensors may update their frequency generating devices or other control parameters that may be probe dependent.

In step 220, transient portions of the system 305 and 310 "settle out" during a delay period. After the gains, offsets, and transmit frequency are adjusted, the signal typically has a transient signal period during which transients must settle out before data acquisition can take place again. The amount of time to wait, i.e., the delay period, will be dependent upon the time constant of the signal conditioning filters and control loop on the transmit frequency within the system. Those of skill in the art understand how to design a time constant to satisfy a target delay period value.

In step 225, the multiplexer control logic waits for the actual measurement to be performed. In an exemplary microwave sensor, the blades or rotor will be interrogated for one or more revolutions of the rotating machine, however, other methods of measurement may be used based the logic implemented in step 230.

Step 230 contains the logic necessary to determine when the multiplexer should be switched. A logical method for determining when to switch the multiplexer can be based on a variety of rules depending on the data to be collected. For example, it may be desirable to have each sensor measure one or more revolutions of data before switching to the next probe. Assuming that any dynamics in the rotating machine was occurring slow compared to the rate of multiplexing, a full measurement of all data points of the turbine could happen at a relatively fast update rate. For example, in a power generating turbine rotating at 3600 RPM, each revolution takes $1/60^{th}$ of a second. For four probes attached to a single electronics card taking a revolution of data on each probe, a full measurement could be made in around $1/15^{th}$ of a second. In this manner, the multiplexer allows each probe to take a snapshot of one or more revolutions of data in a fast enough time that the data can be processed as if independent channels were being used. The amount of time to collect one or two revolutions would be calculated by the multiplexer logic using the once per revolution (1/rev) input signal to determine the speed of the rotor in step 235. As known by one skilled in the art, a typical 1/rev signal will provide a pulse once per rotor rotation. The time between pulses can then be calculated through typical pulse time measurement techniques to determine the speed of the rotor in revolutions per second.

A second logical method for switching could be to measure the same point on the rotor at multiple places. For example, in a gas turbine engine a blade would go past a probe and then the multiplexer could switch to the next probe in order to measure the same blade as it went by. The data collection would only be activated for the amount of time necessary to measure a signal blade. Based on how fast the rotor is turning, which is calculated from the 1/rev input 340, the multiplexer logic 230 determines the amount of time it will take for the blade to travel from the first probe location to the next probe on the engine. The multiplexer would then switch at the appropriate time to allow data collection on the same blade for a short period of time. In this manner, the multiplexer would continue to switch amongst all the probes in circumferential order around the engine until the same blade has been measured for a full revolution. This type of measurement would be useful for applications such as the detection of synchronous and non-synchronous blade vibration that requires data from consecutive probes on the same blade for one or more engine revolutions.

Yet another switching method would be to measure a blade that goes by and then switch to another probe while the first probe was in-between blades and so on. In this manner, the system could switch between blades in an attempt to measure all of the blades on the rotor on multiple probes on a single revolution. This would require precise calculation of blade spacings and the speed by multiplexer logic 230, based on the 1/rev input 340. Commercially available multiplexers, such as the Hittite model HMC322LP4, can switch in 150 ns, which is much faster than the rate at which blades are traveling by the sensor.

Finally, step 235 updates the logic to start measurement on the next probe in the sequence. Once the last probe in the sequence is measured, process 200 will be repeated starting with probe 1.

FIG. 3 is a system level block diagram for an exemplary microwave displacement sensor 300 consisting of an electronics card 304, multiplexer 100, 1/rev input sensor 340 and two or more probes noted by 301, 302, and 303. The electronics card includes an RF signal generation module 305, a circulator 310, an RF demodulation 315, a signal combiner 320, a digitizer 325, digital signal processing measurement logic 330 and multiplxer logic 200. The RF signal generation module is typically implemented as a voltage controlled oscillator (VCO), such as a Hittite HMC358MS8G, with a phase locked loop (PLL), such as an Analog Devices ADF4153. Circulator 310 is a ferrite device that allows continuous transmitting and receiving, as known to those versed in the art. The RF signal then travels to multiplexer 100 where the signal is routed to one of multiple probes such as 301, 302, up to probe N, 303. The signal then travels to the target and is returned back through multiplexer 100 through circulator 310 and into microwave receiver 315. In an exemplary embodiment, the microwave receiver is a zero-IF receiver, but any other quadrature receiver architecture would be suitable as known to one versed in the art. The demodulated signal goes through signal conditioning 320 before it is digitized by digitizer module 325. Finally, the signal is processed and the measurement made by block 330. Multiplexer control logic 200 makes the decisions on how fast to switch between probes and when, as well as controls the analog signal conditioning and transmit frequency. Multiplexer control 200 is set-up to collect data in any one of the ways disclosed above in connection with FIG. 2, such as attempting to switch in-between blades, measure the same blade or point on the rotor all the way around, or have each probe measure a one or more rotor rotations. Multiplexer control 200 uses the 1/rev input 340 to calculate the time to switch the multiplexer, depending on the desired switching rule chosen.

FIG. 4 is a diagram showing a representative example of gas turbine having four probes 403, 404, 406, and 407 useful for monitoring blades 405 of the turbine 400. Each probe has a cable 401 attached to it that is connected to multiplexer 100. In this example, all of the probes are monitoring the same stage, but the probes could also be used to monitor the same circumferential location at multiple stages. This would be useful to monitor shaft alignment or torque on the shaft by comparing relative blade locations.

It should be understood that the foregoing relates only to illustrative embodiments of the present invention, and that numerous changes may be made therein without departing from the spirit and scope of the invention as defined by the following claims.

What is claimed is:

1. A method for controlling a multiplexer for switching between probes of a microwave sensor, comprising the steps of:
   (a) using the multiplexer to select one of the probes;
   (b) updating signal processing constants for the probe;
   (c) adjusting at least one signal conditioning device to optimize signal noise levels and dynamic range for the probe;
   (d) adjusting the transmit frequency to tune the probe to a desired frequency of operation;
   (d) upon expiration of a transition period, completing a data acquisition operation with the probe;
   (e) calculating and applying a time for switching to the next probe prior to enabling the multiplexer to switch to another one of the probes;
   (f) repeating steps (a)-(e) for each of the remaining probes.

2. The method of claim 1 further comprising the step of repeating steps (a)-(f) to continuing operation of the microwave sensor in response to completion of step (f).

* * * * *